United States Patent
Cociglio et al.

(10) Patent No.: US 11,082,316 B2
(45) Date of Patent: Aug. 3, 2021

(54) PERFORMANCE MEASUREMENT IN A PACKET-SWITCHED COMMUNICATION NETWORK

(71) Applicant: Telecom Italia S.p.A., Milan (IT)

(72) Inventors: Mauro Cociglio, Turin (IT); Luca Fantolino, Turin (IT)

(73) Assignee: Telecom Italia S.p.A., Milan (IT)

( * ) Notice: Subject to any disclaimer, the term of this patent is extended or adjusted under 35 U.S.C. 154(b) by 486 days.

(21) Appl. No.: 15/769,915

(22) PCT Filed: Oct. 30, 2015

(86) PCT No.: PCT/EP2015/075344
§ 371 (c)(1),
(2) Date: Apr. 20, 2018

(87) PCT Pub. No.: WO2017/071779
PCT Pub. Date: May 4, 2017

(65) Prior Publication Data
US 2020/0252315 A1 Aug. 6, 2020

(51) Int. Cl.
*H04L 12/26* (2006.01)

(52) U.S. Cl.
CPC ........ *H04L 43/0829* (2013.01); *H04L 43/026* (2013.01); *H04L 43/028* (2013.01);
(Continued)

(58) Field of Classification Search
CPC ............... H04L 43/0829; H04L 43/028; H04L 43/0852; H04L 43/106; H04L 43/026; H04L 43/0817
See application file for complete search history.

(56) References Cited

U.S. PATENT DOCUMENTS

| 6,873,600 B1* | 3/2005 | Duffield | H04L 43/50 370/252 |
| 2007/0153689 A1* | 7/2007 | Strub | H04L 63/1408 370/230 |

(Continued)

FOREIGN PATENT DOCUMENTS

| EP | 1130850 A2 | 9/2001 |
| EP | 1936867 A1 | 6/2008 |

(Continued)

OTHER PUBLICATIONS

Jun. 22, 2016—(WO) ISR and Written Opinion—App PCT/EP2015/075344.

(Continued)

*Primary Examiner* — Omer S Mian
(74) *Attorney, Agent, or Firm* — Banner & Witcoff, Ltd.

(57) ABSTRACT

A method is disclosed for performing a performance measurement on a packet flow transmitted along a path through a packet switched communication network. At least two measurement points implemented on the path calculate a sampling signature for each packet of the flow by applying a hash function to a mask of bits of the packet, and identify a sub-flow of measurement samples as those packets whose sampling signatures are equal to a certain value $H^*$. The measurement points then provide measurement parameters for the measurement samples, which are used for providing performance measurement for the whole packet flow. Tailoring the length of the sampling signature allows the sampling rate to be statistically controlled so as to balance the risk of reception sequence errors between measurement samples and the computational effort on one hand, and the accuracy of the measurements provided on the other hand.

14 Claims, 5 Drawing Sheets

(52) U.S. Cl.
CPC ...... *H04L 43/0817* (2013.01); *H04L 43/0852* (2013.01); *H04L 43/106* (2013.01)

(56) References Cited

U.S. PATENT DOCUMENTS

| | | | |
|---|---|---|---|
| 2013/0223274 A1* | 8/2013 | Cociglio | H04L 43/00 370/253 |
| 2015/0117449 A1* | 4/2015 | Mosko | H04L 45/306 370/392 |
| 2018/0241659 A1* | 8/2018 | Sella | H04L 43/026 |
| 2018/0270045 A1* | 9/2018 | Almuhammadi | H04L 9/0662 |

FOREIGN PATENT DOCUMENTS

| | | | | |
|---|---|---|---|---|
| WO | 2010/072251 A1 | 7/2010 | | |
| WO | 2012/059138 A1 | 5/2012 | | |
| WO | 2013/174417 A1 | 11/2013 | | |
| WO | WO-2013174417 A1 * | 11/2013 | ......... | H04L 43/0894 |
| WO | 2015/042171 A1 | 3/2015 | | |

OTHER PUBLICATIONS

Duffield et al., "A framework for packet selection and reporting; rfc5474.txt", Internet Engineering Task Force, ISOC, Mar. 1, 2009, 38 pages, XP015065543.

* cited by examiner

PERFORMANCE MEASUREMENT IN A PACKET-SWITCHED COMMUNICATION NETWORK

TECHNICAL FIELD

The present invention relates to the field of communication networks. In particular, the present invention relates to a method for performing a performance measurement in a packet-switched communication network. Further, the present invention relates to nodes and computers for communication network configured to implement such a method, and to computer networks comprising such nodes and computers.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

Packets not always reach the destination node, i.e. they may be lost during transmission through the network. Loss of packets is due to different reasons. For instance, a node or link may fail, or packets may be discarded by a node due to a congestion of its ports. Besides, packets may be discarded by a node since they contain bit errors. In any case, when providing a service by transmitting data through a packet-switched network, the rate of packets lost during transmission affects the quality of service (QoS) of that service.

Besides, a packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links. Since the packets are routed hop-by-hop by each node, both the number of possible intermediate nodes crossed by packets and the permanence time of packets at each node are unpredictable. Accordingly, the one-way delay of a packet is almost unpredictable.

Besides, packets of a same packet flow may have different one-way delays. The difference between the one-way delays of two packets of a same data flow is termed "interarrival jitter" (or, briefly, "jitter").

When a communication service (in particular, a real-time voice or data service such as call, conference call, video conference, etc.) is provided by a packet-switched network, a measurement of packet loss, one-way delay and jitter affecting the packet flow carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

WO 2015/042171 describes a network monitoring and analytics system which generates a sparse hash function value for each packet traversing the network and uses it as a unique identifier or thumbprint for the packet. As each packet traverses the network, the packet is identifiable at each node by the hash value identity generated for the packet. In particular, the system comprises a number of observation points which—for each single packet passing therethrough—calculate and record the sparse hash function value and generate analytics data. Analytics data generated at different measurement points for a same packet are then correlated for tracing the trajectory of each packet through the network and for measuring its delay.

SUMMARY OF THE INVENTION

The Applicant has noticed that the system described by WO 2015/042171 exhibits some drawbacks.

In particular, the Applicant has noticed that identifying each single packet traversing a network, generating analytics data for each identified packet and gathering all the analytics data generated by each observation point for each single packet entails generation, transmission and processing of a remarkable amount of data. Hence, a remarkable computation effort and bandwidth consumption is needed in the network.

On the other hand, while the hash function should yield a unique identification of each single packet, ambiguities may arise in concrete. Indeed, collisions between packets may occur, namely different packets may have a same hash function value (when the bits used for calculating the hash function value have the same value in different packets, or when such bits have different values in different packets but the hash functions provide the same result), meaning that they are not distinguishable at the observation points. If a reception sequence error occurs between two undistinguishable packets, the observation points can not detect the error and will provide erroneous analytic data for the packets involved in the reception sequence error.

In view of the above, the Applicant has tackled the problem of providing a method for performing a performance measurement on a packet flow transmitted between two measurement points (nodes or computers) in a packet-switched communication network, which overcomes the aforesaid drawbacks, namely which does not require generation, transmission and processing of a remarkable amount of data and which is more robust against reception sequence errors.

In the following description and in the claims, the expression "performing a performance measurement on a packet flow" will designate an operation of measuring:

- a one-way delay, a two-way delay or a jitter induced on packets of the packet flow by transmission between the two measurement points; and/or
- a packet loss induced on packets of the packet flow by transmission between the two measurement points.

According to embodiments of the present invention, the above problem is solved by a method for performing a performance measurement on a packet flow transmitted through a communication network, which provides for sampling the packet flow at the measurement points based on a sampling signature. More specifically, for each packet passing through a measurement point a respective sampling signature is calculated by applying a hash function to a predetermined mask of bits in the packet. Then, if the sampling signature is equal to a predefined value H* (which will statistically happen for several packets, due to collisions of the hash function), the measurement point determines that the packet is a measurement sample, and accordingly generates or updates parameters for performance measurement relating to this packet. Packets whose sampling signatures are different from H* are instead ignored. Therefore, at each measurement point implemented on the path of the packet flow, the value H* of the sampling signature allows, amongst the packets in transit, a certain sub-flow of measurement samples to be identified, which is the same at each measurement point.

Since whether a packet will be identified as a measurement sample or not depends on the value of its sampling signature, it is not possible to know a priori which packets will be part of the sub-flow of measurement samples. However, the sampling rate may be statistically controlled by suitably tailoring the length of the sampling signature. A shorter sampling signature will provide more collisions and hence a statistically higher sampling rate, which ultimately results in a higher number of measurement samples but also a higher probability of reception sequence errors involving the measurement samples. On the other hand, a longer sampling signature will provide less collisions and hence a statistically lower sampling rate, which ultimately results in a lower probability of reception sequence errors involving the measurement samples but also a lower number of measurement samples.

The length of the sampling signature may accordingly be suitably tailored for balancing the trade off between the accuracy of the measurements provided (which increases as the number of measurement samples increases) on one hand, and the saving of computational resources and robustness against reception sequence errors on the other hand (which instead both improve as the number of measurement samples decreases).

According to a first aspect, the present invention provides a method for performing a performance measurement on a packet flow transmitted along a path through a packet switched communication network, the method comprising, at each one of at least two measurement points implemented on the path:
  a) calculating a sampling signature for each packet of the packet flow by applying a hash function to a mask of bits of the packet;
  b) identifying in the packet flow a sub-flow of measurement samples based on a predefined sampling value H* of the sampling signature, each packet being identified as a measurement sample if its sampling signature is equal to the predefined sampling value H*; and
  c) providing measurement parameters relating to the measurement samples,
the method further comprising performing the performance measurement of the packet flow using the measurement parameters relating to the measurement samples.

Preferably:
  step b) also comprises calculating an identification signature for at least one measurement sample by applying a further hash function to a further mask of a packet identified as the at least one measurement sample; and
  step c) comprises associating the calculated identification signature to a measurement parameter relating to the at least one measurement sample.

Preferably, the further mask comprises more bits than the mask and the identification signature is longer than the sampling signature.

Preferably, the further hash function used for calculating the identification signature is the same as the hash function used for calculating the sampling signature.

According to an embodiment:
  step b) comprises identifying in the packet flow k sub-flows of measurement samples based on k predefined sampling values H1*, . . . Hk* of the sampling signature, k being equal to or higher than 2, each packet being identified as a measurement sample if its sampling signature is equal to anyone of the k predefined sampling values H1*, . . . Hk*; and
  step c) comprises providing k measurement parameters relating to the k sub-flows of measurement samples,
the method comprising performing the performance measurement of the packet flow using the k measurement parameters relating to the k sub-flows of the measurement samples.

According to other embodiments, the packet flow is divided into a sequence of blocks, each block comprising a number of packets, and step c) further comprises:
  providing further measurement parameters relating to the blocks,
the method further comprising performing the performance measurement of the packet flow using also the further measurement parameters relating to the blocks.

Optionally, the packets of the packet flow are marked for dividing the packet flow into first blocks comprising first packets comprising a first marking value and second blocks comprising packets comprising a second marking value, the first blocks alternating in time with the second blocks, and wherein the step c) comprises:
  determining whether the current block is one of the first blocks or one of the second blocks and providing the further measurement parameters relating to the current block.

Alternatively, step b) also comprises:
identifying the measurement samples having the sampling signature equal to the predefined sampling value as boundary packets of the blocks, a block comprising packets comprised between two consecutive measurement samples.

Preferably, step c) comprises:
associating the calculated identification signatures of the measurement samples identified as boundary packets for a block to at least one further measurement parameter relating to the block.

Preferably, step c) comprises generating at least one measurement parameter for each identified measurement sample, and/or updating at least one measurement parameter relating to the sub-flow of measurement samples as a whole.

Optionally, step c) comprises:
  at a first measurement point of the at least two measurement points, generating a transmission timestamp for each identified measurement sample; and
  at a second measurement point of the at least two measurement points, generating a reception timestamp for each identified measurement sample,
wherein performing the performance measurement of the packet flow comprises calculating a one-way delay for each identified measurement sample based on the transmission timestamps and the reception timestamps.

In addition or alternatively, step c) comprises:
  at a first measurement point of the at least two measurement points, increasing a transmission counter counting a number of transmitted measurement samples and updating a cumulative transmission timestamp calculated as a summation of transmission timestamps of the transmitted measurement samples; and
  at a second measurement point of the at least two measurement points, increasing a reception counter counting a number of received measurement samples and updating a cumulative reception timestamp calculated as a summation of reception timestamps of the received measurement samples,
wherein performing the performance measurement of the packet flow comprises calculating a packet loss of the sub-flow of measurement samples and/or an average one-way delay of the sub-flow of measurement samples based on the transmission counter, reception counter, cumulative transmission timestamp and cumulative reception timestamp.

According to a second aspect, the present invention provides a node for a packet switched communication network, the node being configured to:
- for each packet of a received packet flow, calculate a sampling signature by applying a hash function to a mask of bits of the packet;
- identify in the packet flow a sub-flow of measurement samples based on a predefined sampling value H* of the sampling signature, each packet being identified as a measurement sample if its sampling signature is equal to the predefined sampling value H*; and
- providing measurement parameters relating to the measurement samples.

According to a third aspect, the present invention provides a communication network comprising at least a first node and a second node as set forth above.

According to a fifth aspect, the present invention provides a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
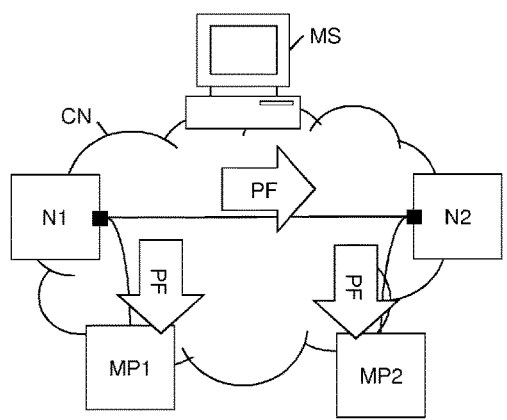
FIG. 1 schematically shows an exemplary packet-switched network.

FIG. 1 schematically shows an exemplary packet-switched communication network CN in which the method for performing a performance measurement according to embodiments of the present invention is implemented. The communication network CN may be an IP network, an Ethernet network, an MPLS network or any other known type of packet-switched communication network.

The communication network CN comprises a plurality of nodes reciprocally interconnected by links according to any known topology. In particular, the communication network CN comprises a first node N1 and a second node N2.

Preferably, the communication network CN is also provided with a management server MS. The management server MS may be either a stand-alone server connected to any of the nodes of the communication network CN. Alternatively, the management server MS may be implemented at any of the nodes of the communication network CN.

A packet flow PF is preferably transmitted from the first node N1 to the second node N2, possibly through intermediate nodes (not shown in FIG. 1) of the communication network CN. The first node N1 may be either the source node of the packet flow PF or an intermediate node of the path from the source node to the destination node. Similarly, the second node N2 may be either the destination node of the packet flow PF or an intermediate node of the path from the source node to the destination node. Further, the packet flow PF may comprise packets generated by a same source node and addressed to a same destination node. Alternatively, the packet flow PF may be a "macro-flow" comprising packets generated by different source nodes and/or addressed to different destination nodes, which only share a length of their paths between the first node N1 and the second node N2.

Preferably, each packet Pki of the packet flow PF comprises a header and a payload. The payload comprises user data. Besides, preferably, the header comprises information for routing the packet Pki. The header format depends on the protocol according to which the packets Pki are formatted.

Figure 2:
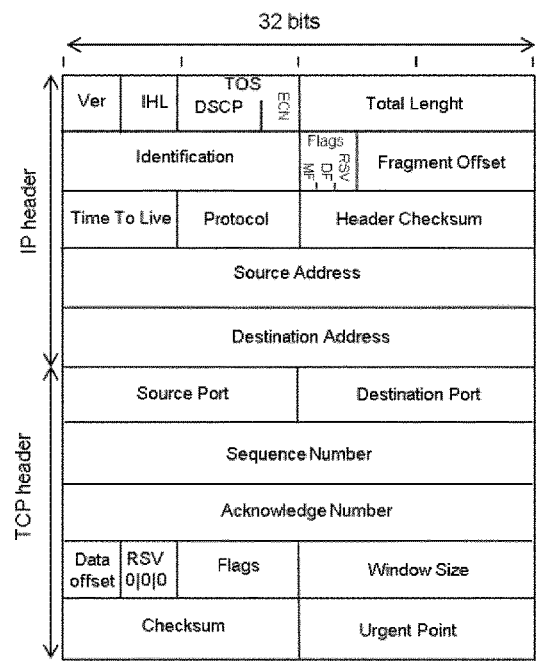
FIG. 2 schematically shows an exemplary packet header's structure.

By way of non limiting example, FIG. 2 shows the header Hi of a packet Pki formatted according to the known TCP (Transmission Control Protocol) over IPv4 (Internet Protocol Version 4). The header Hi comprises 40 bytes divided into 20 bytes for the IP header and 20 bytes for the TCP header. The TCP header in particular comprises the fields Source Port, Destination Port, Sequence Number, Acknowledge Number, Data Offset, RSV (reserved), Flags, Window Size, Checksum and Urgent Point.

Preferably, at least one measurement point is located on the path of the packet flow PF. In FIG. 1, by way of non limiting example, two measurement points are shown: a first measurement point MP1 implemented at the first node N1 and a second measurement point MP2 implemented at the second node N2. In particular, the first measurement point MP1 is preferably implemented at the output port of the first node N1 through which the packet flow PF is transmitted to the second node N2, while the second measurement point MP2 is preferably implemented at the input port of the second node N2 through which the packet flow PF is received from the first node N1.

Each measurement point MP1, MP2 may be either embedded within the respective node N1, N2, or implemented as a stand-alone machine connected to the respective node N1, N2.

According to embodiments of the present invention, both the first measurement point MP1 and the second measurement point MP2 sample the packet flow PF, namely they identify in the packet flow PF a sub-flow of measurement samples based on the value of a sampling signature calculated for each packet of the packet flow PF.

More particularly, according to embodiments of the present invention, each measurement point MP1, MP2 preferably calculates for each packet Pki of the packet flow PF a respective sampling signature by applying a predetermined hash function to a predetermined mask of bits in the packet, preferably in the packet header.

Preferably, the mask of bits to which the hash function is applied depends on the packet format, namely on the protocol according to which the packets Pki are formatted. In general, the mask of bits to be subjected to the hash function are selected according to one or more of the following criteria:

(i) their values shall be invariant through the path of the packet flow PF, or at least through the path length delimited by the nodes provided with measurement points. This way, each measurement point applying the hash function to the mask of bits of a certain packet Pki will obtain the same sampling signature value for that packet. It is therefore preferable avoiding bits of header fields whose values are changed at each node, such as for instance the TTL field and CheckSum of the IP header. If NAT (Network Address Translation) techniques are used, also the bits of the IP addresses shall be avoided;

(ii) their values shall be as entropic as possible within the packet flow PF, meaning that the probability that different packets Pki of the packet flow PF have the bits of the selected mask with the same values is as low as possible. It is therefore preferable avoiding bits of header fields whose values are always or often the same, such as for instance the TCP port field whose value is often 80. For the same reason, if the measurement point is located at an intermediate node of a tunnel carrying the packet flow PF, the tunnel header shall be avoided, since the packets Pki of the packet flow PF have all the same tunnel header; and (iii) they shall be easily accessible within the packets Pki. In particular, the bits of the selected mask are preferably always in the same position within the packet header, so that they may be easily retrieved by the measurement points without the need of parsing the packets or performing other complex processing of the packets.

For instance, if the packets Pki are formatted according to the above mentioned TCP over IPv4 protocol, the mask of bits to which the hash function shall be applied are preferably comprised in the TCP header, excluded the TCP Source Port field and the TCP Destination Port field, namely from 25° byte to 40° byte of the header Hi. In particular, the Checksum field of the TCP header exhibits a particularly high entropy (namely, the probability that different packets Pki of the packet flow PF have Checksum fields with the same value is particularly low), and is accordingly particularly suitable for the calculation of the sampling signature.

If the packets Pki are instead formatted according to the known TCP over IPv6 protocol, the above considerations on the TCP header still apply. The bytes 45° to 60° are then particularly preferred for the calculation of the sampling signature (an offset of 20 bytes shall be considered, since the IP header for IPv6 is 20 bytes longer than the IP header for IPv4).

If the packets are formatted according to any layer 2 protocol (e.g. Ethernet) or MPLS (Multi Protocol Label Switching), the above considerations still apply, provided a suitable offset is considered, because almost all the traffic is IP.

As to the hash function to the applied to the selected mask of bits in the packets Pki, any known hash function may be used, such as for instance:

identity function, which provides as output the values of the bits of the mask. This hash function is preferred if the bits of the mask exhibit a high entropy, e.g. if their values have been calculated (e.g. by the source node) by applying a hash function (for instance the TCP Checksum field, which is computed from the TCP packet and part of IP Header resulting in an highly entropic value);

binary XOR;

one's complement sum, which is typically used at the nodes e.g. for the calculation of the IP Checksum and is easily implementable with general purpose HW;

CRC (Cyclic Redundancy Check), which is typically used for error detection in Ethernet and is easily implementable on dedicated HW;

MD5 (Message Digest 5), which is typically used for low security cryptography and may be implemented on general purpose HW; or SHA-1 (Secure Hash Algorithm 1), which is typically used for medium security cryptography and may be implemented on general purpose HW.

The only requirement is that the hash function is simple enough to allow its calculation on each packet Pki of the packet flow PF.

Figure 3:
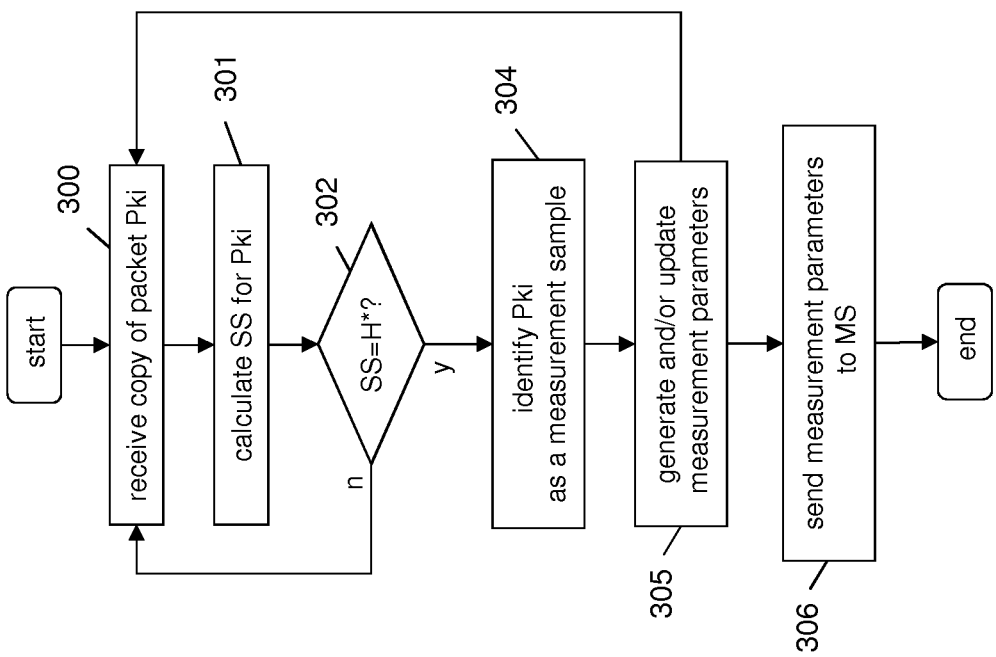
FIG. 3 is a flow chart of the method according to a first embodiment of the present invention.

With reference to the flow chart of FIG. 3, the operation of the measurement points MP1, MP2 according to a first embodiment of the present invention will be described in detail.

As mentioned above, the measurement points MP1, MP2 are configured to identify in the packet flow PF a sub-flow of measurement samples based on the value of a sampling signature calculated for each packet of the packet flow PF. To this purpose, before starting the measurement session, each measurement point MP1, MP2 is properly instructed, the instructions comprising the hash function, the mask of bits to which the hash function shall be applied and a sampling value H*.

Then, as the measurement session begins, each measurement point MP1, MP2 preferably starts receiving a copy of the packet flow PF exiting the node N1 and entering the node N2, respectively.

As a measurement point MP1, MP2 receives a copy of a packet Pki (step 300), it preferably calculates its sampling signature SS as explained above, namely by applying the predetermined hash function to the predetermined mask of bits in the packet Pki (step 301).

The measurement point MP1, MP2 then preferably compares the value of the calculated sampling signature SS with the sampling value H* (step 302). If the value of the calculated sampling signature SS is different from H*, then the measurement point MP1, MP2 preferably ignores the packet Pki and considers the next packet Pki of the packet flow PF.

Otherwise, if the value of the calculated sampling signature SS is equal to H*, the measurement point MP1, MP2 identifies the packet Pki as a measurement sample (step 304). This way, by repeating steps 300-304 on each received packet Pki, each measurement point MP1, MP2 basically identifies in the packet flow PF a sub-flow of measurement samples, whose sampling signatures SS are all equal to H*. It shall be noticed that, since both measurement points MP1, MP2 use a same mask of bits, a same hash function and a same sampling value H* as a discriminant for determining whether a packet is a measurement sample or not, they both identify in the packet flow PF the same sub-flow of measurement samples (except possible packets losses or reception sequence errors involving the measurement samples between N1 and N2, as it will be described herein after).

Upon identification of each measurement sample, each measurement point MP1, MP2 preferably generates at least one measurement parameter relating to the last identified measurement sample, and/or updates measurement parameters relating to the whole sub-flow of measurement samples (step 305).

The measurement parameters generated and/or updated at step 305 are then sent to the management server MS (step 306) either periodically or at the end of the measurement session. The management server MS will then use them for performing at least one performance measurement.

For instance, at step 305 each measurement point MP1, MP2 may generate a transmission or reception timestamp relating to each identified measurement sample. This way, each measurement point MP1, MP2 provides a sequence of transmission or reception timestamps relating to the sub-flow of measurement samples. These sequences of timestamps may be periodically sent by the measurement points MP1, MP2 to the management server MS, which uses them for calculating the one-way delays of the measurement samples from node N1 to node N2.

Alternatively or in addition, at step 305 each measurement point MP1, MP2 upon identification of each measurement sample may increase a transmission or reception counter counting the number of transmitted or received measurement samples and, at the same time, update a cumulative transmission or reception timestamp calculated as a summation of the transmission or reception timestamps of all the already identified measurement samples. The transmission and reception counters and the cumulative transmission and reception timestamps are then preferably periodically sent by the measurement points MP1, MP2 to the management server MS, which uses them for calculating an average delay of the sub-flow of measurement samples from node N1 to node N2, as described by WO 2013/174417 in the name of the same Applicant.

Hence, advantageously, the measurement points MP1, MP2 do not provide measurement parameters for every single packet Pki of the packet flow PF, but for a sub-flow of measurement samples only, which are identified by the measurement points MP1, MP2 as those packets Pki having a sampling signature SS with a certain value H*.

Since the values of the bits of the mask to which the hash function will be applied in the packets Pki by the measurement points is unknown a priori, it is not possible to know in advance which packets Pki will have a sampling signature SS equal to H*, and therefore it is not possible to know a priori which packets will be considered as measurement samples by the measurement points. This means that the measurement samples basically are selected in a random way.

This randomness however does not impair the measurement method, provided that all the measurement points identify the same packets Pki as measurement samples, which is guaranteed by using a same mask of bits, a same hash function and a same sampling value H* at all the measurement points.

Besides, it shall be noticed that—in spite of the above randomness—the average sampling rate may be statistically controlled by suitably tailoring the length of the sampling signature SS. As known from the theory of hash functions, if N is the number of bits of the sampling signature, the probability of having the value H* for the sampling signature is $2^{-N}$, meaning that that value H* will be found every $2^N$ packets on the average. For instance, if N=8 and the measurement samples are identified based on the value H*="00000000", a packet Pki every $2^N$=256 packets will be identified on the average as a measurement sample.

Hence, the longer the sampling signature SS, the lower the number of packets Pki forming the sub-flow of measurement samples.

On one hand, having a lower number of measurement samples advantageously results in a reduced computational effort by the measurement points MP1, MP2 and a lower bandwidth consumption in the communication network CN for transferring the measurement parameters from the measurement points to the management server MS. Moreover, having a lower number of measurement samples also reduces the risk of reception sequence errors involving the measurement samples, because the measurement samples are statistically more spaced within the packet flow PF. A lower number of measurement samples accordingly increases the reliability of the performance measurement results and the robustness of the performance measurement method against reception sequence errors possibly affecting the packet flow PF.

On the other hand, however, a lower number of measurement samples makes the performance measurement results less accurate, in that they reflect more roughly the real behaviour of the whole packet flow PF.

According to the first embodiment, the length N of the sampling signature SS is preferably tailored for balancing the trade off between the accuracy of the measurements provided (which increases as the number of measurement samples increases) on one hand, and the saving of computational resources and robustness against reception sequence errors on the other hand (which instead both improve as the number of measurement samples decreases).

The inventors have estimated that a sampling signature SS with N comprised between 6 and 10 provides a good balance of the above trade-off (in typical situations). For instance, with N=1 the sub-flow of measurement samples is 50% of the packet flow PF, with N=2 the sub-flow of measurement samples is about 25% of the packet flow PF, meaning that both the computational effort and the risk of reception sequence errors involving measurement samples are still quite high. With N=6 the sub-flow of measurement samples is about 1.5% of the packet flow PF, while with N=10 the sub-flow is about 0.1%, which values provide a reasonable computational effort and a reduced risk of reception sequence errors. Providing still longer sampling signatures (namely, N>10) would further improve the robustness to reception sequence errors, but would also provide results reflecting quite imprecisely the real behaviour of the whole packet flow PF.

According to a second embodiment of the present invention, the measurement points MP1, MP2 are configured to identify k (k>1) different sub-flows of measurement samples based on k (k>1) different sampling values $H1^*, \ldots Hk^*$ of the sampling signature SS, each sub-flow comprising packets with sampling signature having a same value amongst $H1^*, \ldots Hk^*$. The measurements points preferably process the sub-flows separately, by providing measurement parameters relating to each sub-flow. The measurement parameters relating to the k sub-flows are then merged (e.g. at the management server MS) for providing overall performance measurements.

Figure 4:
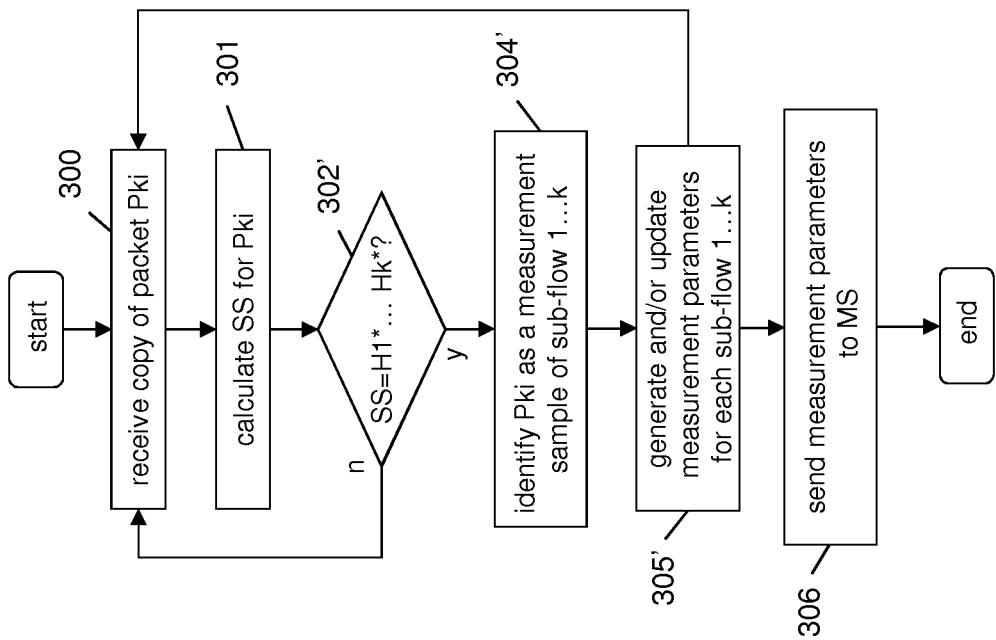
FIG. 4 is a flow chart of the method according to a second embodiment of the present invention.

The operation of the measurement points MP1, MP2 according to this second embodiment is shown in FIG. 4. As it may be appreciated in FIG. 4, the operation of the measurement points MP1, MP2 according to the second embodiment differs from the first embodiment in that:
 (i) at step 302' (corresponding to step 302 of the first embodiment) each measurement point MP1, MP2 compares the sampling signature SS of each packet Pki with each one of the k sampling values $H1^*, \ldots Hk^*$,
 (ii) at step 304' (corresponding to step 304 of the first embodiment), each measurement point MP1, MP2 identifies the packet Pki as a measurement sample if the value of the sampling signature SS is equal to anyone of the values $H1^*, \ldots Hk^*$, thereby forming k different sub-flows; and (iii) at step 305' (corresponding to step 305 of the first embodiment), each measurement point MP1, MP2 generates and/or updates measurement parameters relating to each single sub-flow.

This allows setting a length N of the sampling signature SS high enough to avoid (or at least minimize the risk of) reception sequence errors and, at the same time, providing a number of measurement samples adequately reflecting the behaviour of the whole packet flow PF. Indeed, a packet is identified as a measurement sample every $2^N/k$ packets. This is particularly advantageous in high rate packet flows (e.g. 10 Gbps or more) or in communication networks where the risk of reception sequence errors involving a particularly high number of packets exists. For instance, according to this second embodiment N may be set equal to 12, and then k=4 sub-flows of measurement samples may be identified comprising packets Pki with sampling signatures SS with the first 10 bits having a same value (e.g. "0000000000") and the last 2 bits equal to "00", "01", "10" or "11".

According to a third embodiment of the present invention, in order to solve the above trade-off between the accuracy of the measurements provided (which increases as the number of measurement samples increases) on one hand, and the robustness against reception sequence errors on the other hand (which instead improves as the number of measurement samples decreases), the measurement samples are identified not only by the sampling signature SS, but also by an identification signature IS which allows unique identification of each single measurement sample within the sub-flow of measurement samples.

This allows selecting the length N of the sampling signature SS short enough to guarantee a sufficiently high number of measurement samples, while the detrimental effects of possible reception sequence errors involving the measurement samples are avoided by providing an identification signature IS with length N' sufficiently high to minimize the risk of ambiguities, namely the risk that two measurement samples have the same identification signature IS.

Similarly to the sampling signature SS, also the identification signature IS is preferably calculated by applying a hash function to a mask of bits of each packet, in particular of each packet header. Preferably, the mask of bits used for calculating the identification signature IS is different from the mask of bits used for calculating the sampling signature SS. In particular, the mask of bits used for calculating the identification signature IS comprises more bits than the mask of bits used for calculating the sampling signature SS. A longer mask of bits for the calculation of the identification signature IS advantageously allows minimizing the risk of collisions between measurement samples, and then maximizing the probability of unique identification of each single measurement sample.

Besides, the hash function used for calculating the identification signature IS may be the same as the hash function used for calculating the sampling signature SS. Alternatively, a different hash function (preferably, amongst those mentioned above) may be used for calculating the identification signature IS.

Figure 5:
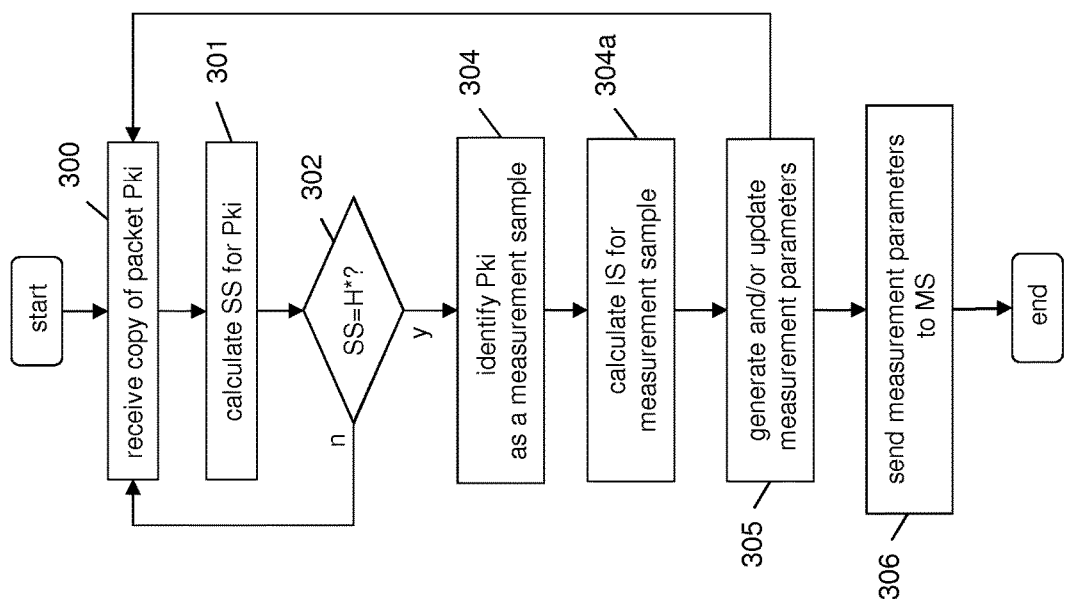
FIG. 5 is a flow chart of the method according to a third embodiment of the present invention.

The operation of the measurement points according to the third embodiment of the present invention is shown in FIG. 5.

As it may be appreciated in FIG. 5, the operation of the measurement points MP1, MP2 according to the third embodiment differs from the first embodiment in that, after step 304 of identifying a packet Pki as a measurement sample because its sampling signature SS is equal to H*, each measurement point MP1, MP2 preferably also calculates an identification signature IS for the measurement sample (step 304a).

Then, if at step 305 measurement parameters are generated which relate to the single measurement sample (e.g. a transmission or reception timestamp), the generated measurement parameters are associated with the value of the identification signature IS.

Besides, at step 306 the measurement parameters of each measurement sample are transmitted to the management server MS together with the respective values of the identification signature IS. This allows the management server MS to uniquely identify measurement parameters relating to a same measurement sample and originated at different measurement points. Possible reception sequence errors involving two or more measurement samples (which may occur, since the length N of the sampling signature SS is quite short in order to provide a sufficiently high number of measurement samples) accordingly do not impair the capability of the management server MS to properly identify measurement parameters relating to a same measurement sample and provide accurate performance measurements immune from those errors.

For example, a sampling signature SS of e.g. N=8 bits and an identification signature IS of e.g. N'=64 bits advantageously provide a measurement sample every 256 packets Pki of the packet flow and, at the same time, provide a probability of ambiguities amongst measurement samples of $0.5*10^{-19}$.

According to a fourth embodiment of the present invention, the sampling signature SS is used by the measurement points MP1, MP2 in combination with an alternate marking of the packets Pki of the packet flow PF as described by WO 2010/072251 in the name of the same Applicant.

More particularly, according to the fourth embodiment the packets Pki of the packet flow PF are marked (either at the node N1, or at a further node located upstream the node N1 which originated the packet flow PF) for dividing the packet flow PF in blocks. The packets Pki are marked e.g. by setting a bit of their header to "1" or "0", in such a way that blocks of packets marked by "1" alternate in time with blocks of packets marked by "0". The blocks may have a same duration Tb, also termed "block period" (e.g. 5 minutes).

Figure 6:
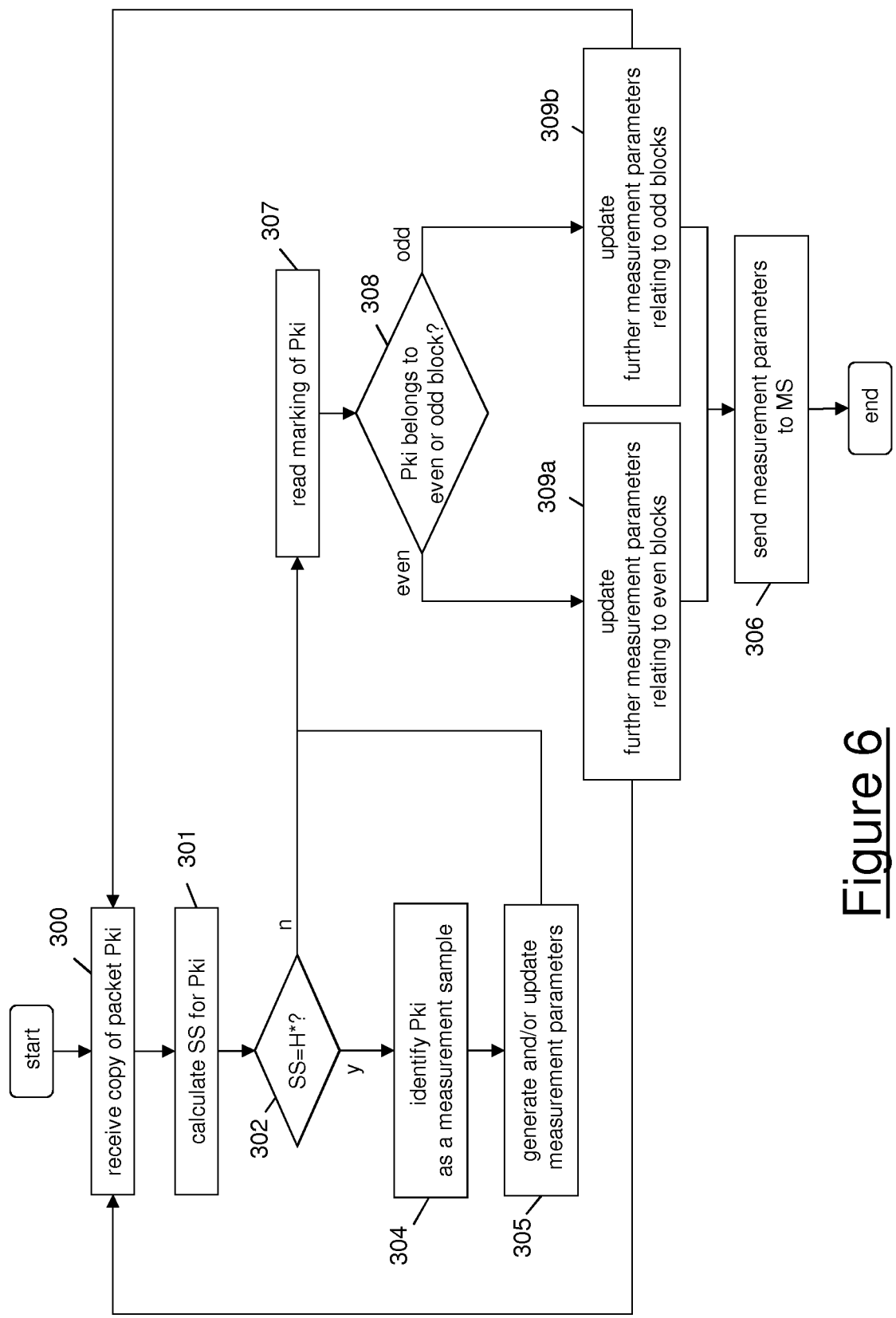
FIG. 6 is a flow chart of the method according to a fourth embodiment of the present invention.

The operation of the measurement points according to the fourth embodiment of the present invention is shown in FIG. 6.

As it may be appreciated in FIG. 6, the operation of the measurement points MP1, MP2 according to the fourth embodiment is the same as the first embodiment, namely they carry out step 301 (calculation of the sampling signature SS), step 302 (comparison with the sampling value H*), step 304 (identification of the packet as a measurement sample if SS=H*) and step 305 (generation and/or update of measurement parameters relating to the measurement samples).

In addition to the above steps, according to the fourth embodiment each measurement point MP1, MP2 also reads the marking of each packet Pki (step 307), independently of whether it is a measurement sample or not. Based on the marking, each measurement point MP1, MP2 determines whether the packet Pki belongs to an even block or an odd block (step 308).

Then, if the packet Pki belongs to an even block, each measurement point preferably updates at least one further measurement parameter relating to the even blocks of the packet flow PF (step 309a) and, similarly, if the packet Pki belongs to an odd block, each measurement point preferably updates at least one further measurement parameter relating to the odd blocks of the packet flow PF (step 309*b*).

Specifically, at steps 309*a*, 309*b* each measurement point MP1, MP2 may increase a transmission or reception counter counting the number of transmitted or received packets of the even or odd blocks and, at the same time, update a cumulative transmission or reception timestamp calculated as a summation of the transmission or reception timestamps of all the packets forming the even or odd blocks, as described by WO 2013/174417 in the name of the same Applicant.

Then, at step 306 the measurement points MP1, MP2 preferably send to the management server MS all the measurement parameters previously generated that, according to the fourth embodiment, include not only those relating to the sub-flow of measurement samples generated and/or updated at step 305, but also the further measurement parameters relating to even and odd blocks of the packet flow PF updated at steps 309*a*, 309*b*.

Similarly to the first embodiment, the management server MS then preferably uses the measurement parameters relating to the sub-flow of measurement samples for providing performance measurements relating to this sub-flow, namely: one-way delay for each single measurement sample and/or packet loss of the sub-flow of measurement samples and/or average one-way delay of the sub-flow of measurement samples.

In addition, according to the fourth embodiment, the management server MS also preferably uses the further measurement parameters relating to the even and odd blocks of the packet flow PF for providing other performance measurements relating to the whole packet flow PF, such as packet loss of the packet flow PF and/or average one-way delay of the packet flow PF, as described by WO 2013/174417 in the name of the same Applicant.

This fourth embodiment is advantageous in that the packet loss calculation carried out on the sub-flow of measurement samples allows detecting possible packet losses and hence discarding the performance measurement relating to the odd or even block transmitted during the block period Tb wherein the packet loss was detected.

It shall be noticed that, since the sampling signature SS should be equal to H* for all measurement samples, independently of whether they are part of an odd block or an even block, the mask of bits upon which the hash function is applied for calculating the sampling signature SS preferably does not include the marking bit(s).

According to a fifth embodiment, the methods according to the third and fourth embodiments described above are combined. Similarly to the fourth embodiment, the packet flow PF is divided into a sequence of blocks by using the alternate marking technique described above, while a sub-flow of measurement samples is identified by the measurement points MP1, MP2 based on the value of the sampling signature SS. In addition, similarly to the third embodiment, the measurement points MP1, MP2 also uniquely identify each single measurement sample based on the value of its identification signature IS.

Similarly to the third embodiment, the sampling signature SS may be quite short (e.g. N=8) in order to provide a sufficiently high number of measurement samples, whereas the identification signature IS is longer in order to minimize the risk of identification ambiguities (e.g. N'=32).

Hence, according to this fifth embodiment, the measurement parameters relating to each measurement sample are associated with a value of the identification signature which uniquely identifies the measurement sample and its measurement parameters. Possible reception sequence errors and possible packet losses accordingly do not affect the accuracy of the performance measurement results.

According to a sixth embodiment, the division in blocks of the packet flow PF may be achieved—instead of using the marking as described above—by identifying the packets with sampling signature SS equal to H* not only as measurement samples, but also as the boundary packets that divide the packet flow PF in blocks. Hence, according to the sixth embodiment, there is no marking of the packets Pki, and a block is defined as the sequence of packets Pki comprised between two consecutive packets Pki having sampling signature SS equal to H*. For instance, a sampling signature SS of N=10 bits provides blocks of about $2^N=1024$ packets on the average.

Further, according to the sixth embodiment, each single block is preferably uniquely identified by the identification signatures IS of its two boundary packets. The identification signatures IS for the boundary packets are preferably calculated as described above with reference to the third embodiment.

Figure 7:
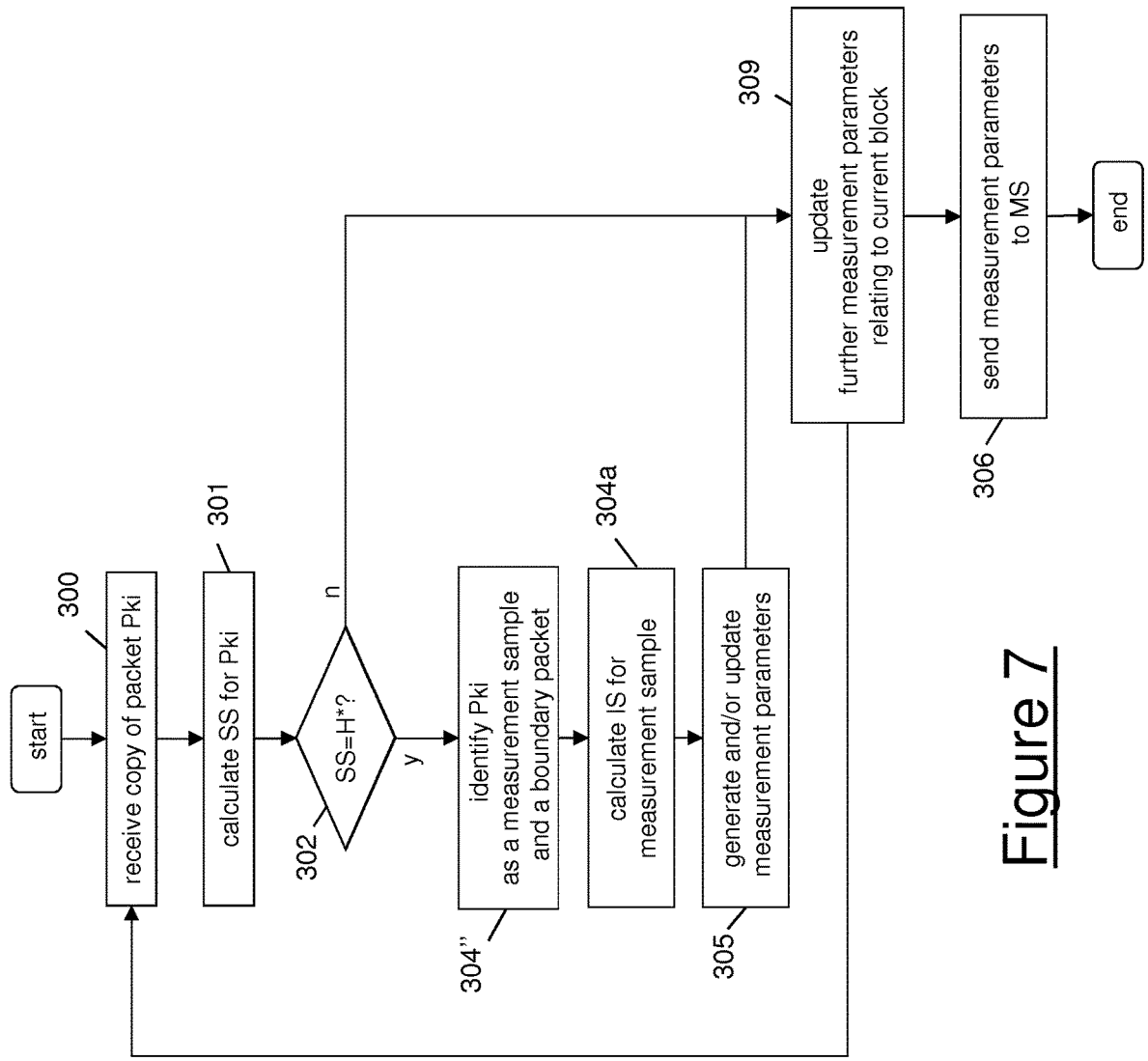
FIG. 7 is a flow chart of the method according to a sixth embodiment of the present invention.

The operation of the measurement points according to the sixth embodiment of the present invention is shown in FIG. 7.

As it may be appreciated by the flow chart of FIG. 7, the operation of the measurement points MP1, MP2 according to the sixth embodiment is similar to that of the fourth embodiment, with the following differences:
- (i) at step 304'' (corresponding to step 304 of the fourth embodiment), each measurement point MP1, MP2 identifies a packet Pki whose sampling signature SS is equal to H* not only as a measurement sample, but also as a boundary packet between two consecutive blocks;
- (ii) each measurement point MP1, MP2 also calculates an identification signature IS for each boundary packet (step 304*a*);
- (iii) each measurement point MP1, MP2 also preferably updates at least one further measurement parameter relating to the current block of the packet flow PF (step 309).

It shall be noticed that each measurement point MP1, MP2 may uniquely identify each single block using the two identification signatures IS of the two boundary packets delimiting the block. Such identification signatures, at step 309, are preferably associated to the generated and/or updated parameters relating to the current block.

Such an association is also transmitted to the management server MS at step 306. This allows the management server MS to uniquely identify measurement parameters relating to a same block and originated at different measurement points.

The invention claimed is:

1. A method for performing a performance measurement on a packet flow transmitted along a path through a packet switched communication network, said method comprising, at each one of at least two measurement points implemented on the path:
    calculating a sampling signature for each packet of the packet flow by applying a hash function to a mask of bits of the packet;
    identifying in the packet flow a sub-flow of measurement samples based on a predefined sampling value of the sampling signature, each packet being identified as a measurement sample if its sampling signature is equal to the predefined sampling value, wherein:
        each of the at least two measurement points are provided with the predefined sampling value before either of the at least two measurement points start the performance measurement, and the identifying also comprises calculating an identification signature, different than the sampling signature, for at least one measurement sample by applying a further hash function to a further mask of a packet identified as the at least one measurement sample, wherein the identification signature is longer than the sampling signature;

providing measurement parameters relating to the measurement samples, wherein the providing comprises associating the calculated identification signature to a measurement parameter relating to the at least one measurement sample; and sending, to a measurement server, the measurement parameters relating to the measurement samples, wherein the measurement server is configured to perform the performance measurement of the packet flow using the measurement parameters relating to the measurement samples.

2. The method according to claim 1, wherein the further mask comprises more bits than the mask.

3. The method according to claim 1, wherein the further hash function used for calculating the identification signature is the same as the hash function used for calculating the sampling signature.

4. The method according to claim 1, wherein:

the identifying comprise s identifying in the packet flow k sub-flows of measurement samples based on k predefined sampling values of the sampling signature, k being equal to or higher than 2, each packet being identified as a measurement sample if its sampling signature is equal to anyone of the k predefined sampling values, the providing comprises providing k measurement parameters relating to the k sub-flows of measurement samples, and the performing the performance measurement of the packet flow uses the k measurement parameters relating to the k sub-flows of the measurement samples.

5. The method according to claim 1, wherein the packet flow is divided into a sequence of blocks, each block comprising a number of packets, and wherein the providing further comprises:

providing further measurement parameters relating to the blocks, wherein the performing the performance measurement of the packet flow uses also the further measurement parameters relating to the blocks.

6. The method according to claim 5, wherein the packets of the packet flow are marked for dividing the packet flow into first blocks comprising first packets comprising a first marking value and second blocks comprising second packets comprising a second marking value, the first blocks alternating in time with the second blocks, and wherein the providing comprises:

determining whether a current block is one of the first blocks or one of the second blocks and providing the further measurement parameters relating to the current block.

7. The method according to claim 5, wherein the identifying also comprises:

identifying the measurement samples having the sampling signature equal to the predefined sampling value as boundary packets of the blocks, a block comprising packets between two consecutive measurement samples.

8. The method according to claim 1, wherein the providing comprises:

associating the calculated identification signatures of the measurement samples identified as boundary packets for a block to at least one further measurement parameter relating to the block.

9. The method according to claim 1, wherein the providing comprises generating at least one measurement parameter for each identified measurement sample, and/or updating at least one measurement parameter relating to the sub-flow of the measurement samples as a whole.

10. The method according to claim 9, wherein the providing comprises:

at a first measurement point of the at least two measurement points, generating a transmission timestamp for each identified measurement sample; and at a second measurement point of the at least two measurement points, generating a reception timestamp for each identified measurement sample, and the performing the performance measurement of the packet flow comprises calculating a one-way delay for each identified measurement sample based on the transmission timestamps and the reception timestamps.

11. The method according to claim 9, wherein the providing comprises:

at a first measurement point of the at least two measurement points, increasing a transmission counter counting a number of transmitted measurement samples and updating a cumulative transmission timestamp calculated as a summation of transmission timestamps of the transmitted measurement samples; and at a second measurement point of the at least two measurement points, increasing a reception counter counting a number of received measurement samples and updating a cumulative reception timestamp calculated as a summation of reception timestamps of the received measurement samples, wherein the performing the performance measurement of the packet flow comprises calculating a packet loss of the sub-flow of measurement samples and/or an average one-way delay of the sub-flow of measurement samples based on the transmission counter, reception counter, cumulative transmission timestamp and cumulative reception timestamp.

12. A node for a packet switched communication network, the node being configured to:

for each packet of a received packet flow, calculate a sampling signature by applying a hash function to a mask of bits of the packet;

identify in the packet flow a sub-flow of measurement samples based on a predefined sampling value of the sampling signature, each packet being identified as a measurement sample if its sampling signature is equal to the predefined sampling value, wherein:

other nodes of the packet switched communication network and the node are both provided with the predefined sampling value before calculation of the sampling signature by the node, and the identifying also comprises calculating an identification signature, different than the sampling signature, for at least one measurement sample by applying a further hash function to a further mask of a packet identified as the at least one measurement sample, wherein the identification signature is longer than the sampling signature; and provide measurement parameters relating to the measurement samples, wherein the providing comprises associating the calculated identification signature to a measurement parameter relating to the at least one measurement sample.

13. A communication network comprising at least a first node and a second node according to the node of claim 12.

14. A non-transitory computer readable memory including software code portions that, when executed by a computer, perform steps of:
calculating, at each one of at least two measurement points implemented on a path through a packet switched communication network, a sampling signature for each packet of a packet flow by applying a hash function to a mask of bits of the packet;
identifying in the packet flow a sub-flow of measurement samples based on a predefined sampling value of the sampling signature, each packet being identified as a measurement sample if its sampling signature is equal to the predefined sampling value, wherein:
    each of the at least two measurement points are provided with the predefined sampling value before either of the at least two measurement points calculate the sampling signature, and
    the identifying also comprises calculating an identification signature, different than the sampling signature, for at least one measurement sample by applying a further hash function to a further mask of a packet identified as the at least one measurement sample, wherein the identification signature is longer than the sampling signature;
providing measurement parameters relating to the measurement samples, wherein the providing comprises associating the calculated identification signature to a measurement parameter relating to the at least one measurement sample; and
sending, to a measurement server, the measurement parameters relating to the measurement samples, wherein the measurement server is configured to perform performance measurement of the packet flow using the measurement parameters relating to the measurement samples.

\* \* \* \* \*